United States Patent [19]

Tabata et al.

[11] Patent Number: 5,580,517
[45] Date of Patent: Dec. 3, 1996

[54] METHOD OF MAKING COMPOSITES OF METALS AND OXIDES

[75] Inventors: Hiroyuki Tabata; Tetsurou Kawajiri, both of Fukuoka, Japan

[73] Assignee: Kyushu Ceramics Industry Co., Ltd., Fukuoka-ken, Japan

[21] Appl. No.: 336,034

[22] Filed: Nov. 8, 1994

[51] Int. Cl.⁶ ........................................... B22F 3/16
[52] U.S. Cl. .................... 419/5; 419/10; 419/19; 419/27; 419/38; 419/47
[58] Field of Search ..................... 419/5, 10, 19, 419/27, 38, 47; 428/547, 548, 552, 553

[56] References Cited

U.S. PATENT DOCUMENTS

| | | | |
|---|---|---|---|
| 3,779,714 | 12/1973 | Nadkarni et al. | 29/182.5 |
| 4,585,618 | 4/1986 | Fresnel et al. | 419/12 |
| 4,610,726 | 9/1986 | King | 75/233 |
| 4,689,077 | 8/1987 | Chevigne et al. | 75/233 |
| 4,752,333 | 6/1988 | Caisso et al. | 75/232 |
| 4,761,262 | 8/1988 | Ogata et al. | 419/10 |
| 4,851,375 | 7/1989 | Newkirk et al. | 501/88 |
| 4,871,437 | 10/1989 | Marschman et al. | 204/291 |
| 4,948,676 | 8/1990 | Darracq et al. | 428/539.5 |
| 5,077,246 | 12/1991 | Weaver et al. | 501/98 |
| 5,110,688 | 5/1992 | Sekhar et al. | 428/552 |
| 5,139,720 | 8/1992 | Takeda et al. | 264/66 |
| 5,366,686 | 11/1994 | Mortensen et al. | 419/5 |
| 5,389,450 | 2/1995 | Kennedy et al. | 428/552 |

*Primary Examiner*—Charles T. Jordan
*Assistant Examiner*—Danrel Jenkins
*Attorney, Agent, or Firm*—Jordan and Hamburg

[57] ABSTRACT

Composites are grown by contacting pressed aluminum powder forms or metal masses with oxide powder as the oxygen supply source needed for composite growing and then heating, with reaction sintering by a thermite reaction between the oxides and aluminum supplied by capillary action.

9 Claims, 3 Drawing Sheets

METHOD OF MAKING COMPOSITES OF METALS AND OXIDES

BACKGROUND OF THE INVENTION

The present invention is one that relates to a method of making composites of metals with their metal oxides using, for example, aluminum and alumina, and bonding these composites with metal or ceramic members.

Prior conventional methods of bonding of metals and metal oxides used appropriate proportions of oxides in the form of flakes, particles and fibers in order to increase the mechanical, chemical and physical properties of the metals with respect to their increased strength and of the metal oxides with respect to their refractory, anti-corrosion and wear resistant properties. The properties of these composites were widely utilized in applications such as cyclone liners, piston engine cams, burner tubes and parts for heating furnaces.

Japanese Patent Publication Hei 3-75508 [1991] described such a method of making such ceramics wherein a ceramic matrix composite is obtained by forming a mother metal oxide ceramic by oxidation reaction of the mother metal, and shaping the mother metal oxide that would be the growth material in the oxide formed as a three dimensional network.

Oxides of such mother metals require introduction of gas phase oxidizers of oxygen or air in order to perform the oxidation reaction. As a result, this method requires a special apparatus for introducing the oxidizers inside the furnace, resulting in escalating equipment costs. Additionally, this method requires smelting furnaces or melt sinks in order to melt the mother metal that is the supply material for growing the composite. Accordingly, they require specialized calcining furnaces, which is turn requires complicated calcining work and work supervision.

A principal drawback of this method in the mother metal cannot bond with metal members during the manufacture of composites because the surfaces of these metal members are oxidized.

Further, there are difficulties in adding metal elements to the composites because the oxygen supply source is air. Thus, composite growth cannot occur in a direction where the preform oxygen supply is shielded and it is necessary to form barriers to prevent composite growth. As a result there is directionality in the preform immersion in the smelting furnace, and it is necessary to, as discussed above to supervise the operation inside the furnace during calcining.

SUMMARY OF THE INVENTION

An object of the present invention is to provide a method to obtain composites of metals and oxides of any desired composition using a a simple apparatus. Another object is to provide a method of making composites of metals and oxides that can bond metal members or ceramic members at the same time as making the composites.

The above objects of the present invention are achieved by a method of making composites and a method of bonding metal members or ceramic members to the composites. The inventive method contacts metal masses or pressed metal powder forms with oxide powder that, as the oxygen supply source required for composite growth, and turns the heated metal and oxide into a matrix.

The oxide powder used as the oxygen supply source required for composite growth is an oxide powder of alloy elements in solid solution or in compounds in the composite, making it possible to make composites containing the alloy elements and increasing the properties of the composite.

As a specific example, the invention can be applied to growing composites by reaction sintering with a thermite reaction of aluminum supplied by capillary action and oxide powder, as the oxygen supply source required for composite growth.

The calcining atmosphere for reaction sintering can be selected based on what is being treated because the oxygen used is present in the form of solid oxide and no supply of gaseous oxygen is required. For example, when bonding by calcining together with the metal, the atmosphere is inert, and when making a composite by bonding ceramics, it is possible to select within a broad range from an atmosphere in which oxygen or air is introduced to an inert atmosphere or an oxidized atmosphere like an air atmosphere. Further, it is also possible to calcine in an air atmosphere that costs nothing, depending on the types of oxide powders and their blends.

The oxides serving as these oxygen supply sources may be iron oxides $FeO$ and $Fe_2O_3$ or other oxides such as $NiO$ or $Cr_2O_3$, alone or in blends of two or more. Further, when refractoriness, corrosion resistance and wear resistance are required, it is also possible to mix nitrides, carbides and borides in with these oxides. However, nitrides, carbides, borides and oxides such as alumina, zirconia or calcia that have weaker oxygen affinity than aluminum will not be sources of oxygen supply, so that the proportion contained in the oxide powder filler must not be over 98%.

DESCRIPTION OF THE PREFERRED EMBODIMENTS

Figure 1:
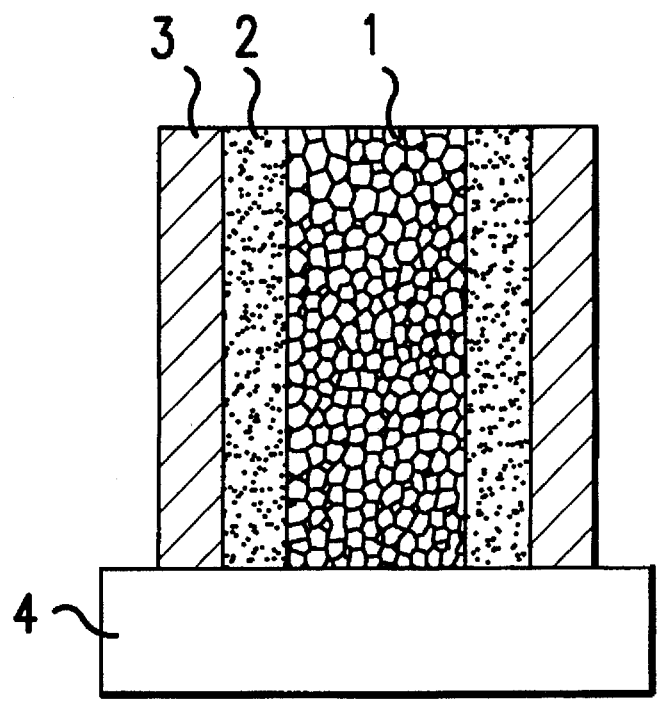
FIG. 1 is a sectional view of a construction of mixed powder before calcining.

Metal masses or pressed metal powder forms are heated under contact with filler containing two or more oxide powders including magnesium oxide as the oxygen supply source needed for composite growing. The oxides are reduced by metal supplied by capillary action, and the metal simultaneously forms new oxides. At this time, the formation of melt passages having a three dimensional network structure simultaneously occurs in the oxides newly formed by reduction because of the presence of the magnesium oxide powder. The melt passages form a composite of the newly formed oxide and the metal supplied by capillary action, and this reaction is repeated in layers to grow the composite layers.

For example, when the metal substrate is aluminum, an investigation of the equilibrium oxygen partial pressure of the aluminum, oxygen and alumina under calcining temperatures shows that nearly all of the alloy elements that increase the properties have higher equilibrium oxygen partial pressures than aluminum. Because of this, the elements that construct oxides from the thermite reaction of aluminum and oxide, other than those reduced and evaporated, either remain as solid solution and compounds in the composite or form separation layers in the composite that are neither solid solutions nor compounds. By blending various oxides it is possible to make composites having different properties.

In bonds that utilize these oxides, the growing of composites is supported by the thermite reaction. The reaction interface rises up to about 2,000° C. from the heat of reaction, and because of this when the reaction interface grows to the bond portions, the bond portions are in a state where they are exposed to high temperature conditions. When when the metal substrate is aluminum, the shapes of the bond portions change depending on the types of oxides and their blends.

I. When the blended oxide material is mainly FeO or $Fe_2O_3$, then $$2Al+3FeO=Al_2O_3+3Fe$$

$$2Al+Fe_2O_3=Al_2O_3+2Fe$$

Under the above thermite reactions, ordinarily the alumina and iron separate and iron sinks to the bottom, due to its greater specific gravity, but with the present invention there is a phenomenon where the iron is extruded to the highest tip of composite growing. Because of this the iron elements contact at the bond interface, where the bond portion melts and bonds. In this manner, when ferric oxides such as FeO and $Fe_2O_3$ are used as the starting materials, the bond may be considered as being metal to metal.

II. When the main materials are other than oxides of FeO or $Fe_2O_3$ such as oxides of NiO or $Cr_2O_3$, then $$2Al+Fe_2O_3=Al_2O_3+2Fe$$

$$2Al+3NiO=Al_2O_3+3Ni$$

$$2Al+Cr_2O_3=Al_2O_3+2Cr$$

As shown above the oxygen sources are $Fe_2O_3$, NiO and $Cr_2O_3$, and when the proportion of $Fe_2O_3$ in the blend is small, the Cr of course, and the Ni and Fe as well, are not separated from the composite to make extruded metal layers as described under I. In this case almost all of the Cr evaporates, but the Ni and Fe together either make solid solutions in the composite or form compounds and end up being residual. Consequently the bond interface is a metal or ceramic bond of aluminum compounds and aluminum with solid solutions of Ni, Cr and Fe that rose from capillary action.

When the bonding pairs are metal, there are cases of bonding between the aluminum with solid solutions of Ni, Cr and Fe leached up by capillary action and the compounds because of diffusion, and also cases of fusion bonding when the composite, in a state of high temperature melts the metal.

With ceramic bonds, there does occur diffusion of the aluminum compounds and the aluminum with solid solutions of Ni, Cr and Fe emerging from the bonding interface.

Also, the present invention not only uses melts made by melting metal blocks as the metal substrate for the growing material of the composite, but can also used pressed metal powder. Even though the temperature is above the melting point of metal, what melts is only the powder inside because the metal powders are individually coated with oxide films. Also, these powders form passages for molten metal under a state where portions of the oxide films undergo interconnected destruction from heat stress, so that (1) melt is supplied to the oxide powder, and (2) because there is no meltdown they become receiving vessels or portions thereof for oxide powder fillers.

The explanations of the present invention below will be based on examples where aluminum powder is used as the metal substrate.

FIG. 1 shows a sectional view of a construction of mixed powder before calcining. FIG. 1 shows aluminum powder, 0.3 mm in mean particle diameter formed in cylindrical shape by press forming under pressure of 500 kg/mm². A filler 2 includes oxide powder and the types and compositions of oxide are varied depending on the material of a receiving tube 3. Rerceiving tube 3 is a conventional steel tube, but may also be an alumina tube or an uncalcined alumina green. Stand 4 is at the base of the construction.

EXAMPLE I

This is an example of making composites with the object of bonding with metal (Table 1).

Figure 2:
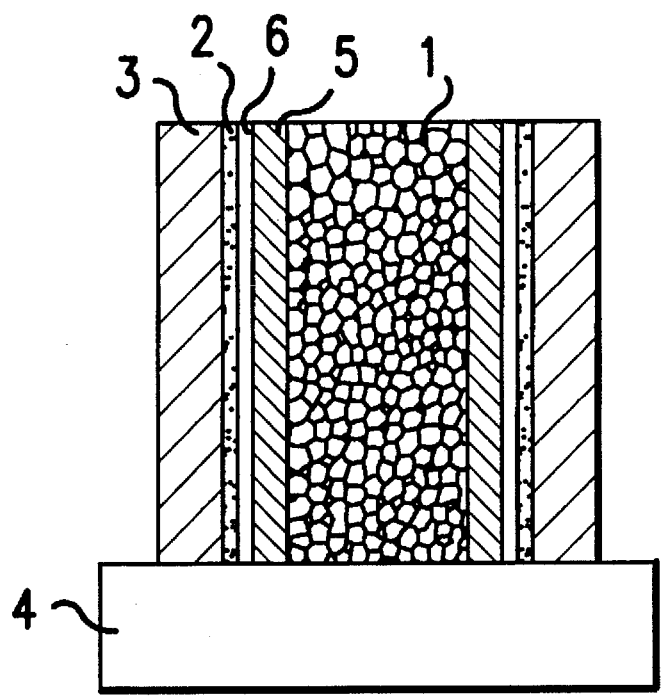
FIG. 2 is a sectional view of an example during calcining.

FIG. 2 has the receiving tube 3 of FIG. 1 made of SUS 304 stainless steel, and shows the conditions during calcining when filler 2 is a mixed powder filler of 92 wt % $Fe_2O_3$ and 8 wt % of fine particle MgO. Argon gas was used as the atmosphere, and calcining was done for 8 hours at a temperature of 1,100° C. In this calcining process, the molten aluminum inside the powder particles in the pressed aluminum powder 1 shown in FIG. 2 had their oxide films successively destroyed. The oxide films leached toward oxide powder 2 and contacted it, so that a themite reaction occurred as shown in Equation 1.

$$2Al+Fe_2O_3=2Fe+Al_2O_3 \qquad \text{Equation 1}$$

The aluminum supplied by capillary action and oxide filler 2 react. Molten iron 6 separates and leaches out from the composite 5 and grows toward the wall of steel tube 3. In in the final stage, where oxide powder 2 2 is consumed, molten iron 6 and the wall of stainless steel tube 3 come into contact, fuse under high temperature conditions and are bonded. When the blend proportion of ferric oxides such as $Fe_2O_3$ are high as they were in this case, the composite and iron will separate as shown in FIG. 2, so that iron plays the role of bonding.

Also, when the filler proportions in oxide powder 2 are FeO 46 wt %, $NiO_2$ 46 wt % and MgO 8 wt % or when they are NiO 46 wt %, $Cr_2O_3$ 46 wt % and MgO 8 wt %, the growing composite 5 and molten iron 6 do not separate, so that we get the following.

$$2Al+3FeO=3Fe+Al_2O_3 \qquad \text{Equation 2}$$

$$2Al+3NiO=3Ni+Al_2O_3$$

$$2Al+NiO=3Ni+Al_2O_3 \qquad \text{Equation 3}$$

$$2Al+Cr_2O_3=2CR+Al_2O_3$$

In the case of Equation 2 above, the Fe and Ni correspond to molten iron 6 in FIG. 2, but the Fe separates only a little on the surface, and both the Fe and the Ni are in a state where they are contained in composite 5.

In the case of Equation 3, the Ni and Cr correspond to molten iron 6 in FIG. 2, but in this case although most of the Cr evaporates, both the Cr and Ni are in a state where they are contained in composite 5.

Figure 3:
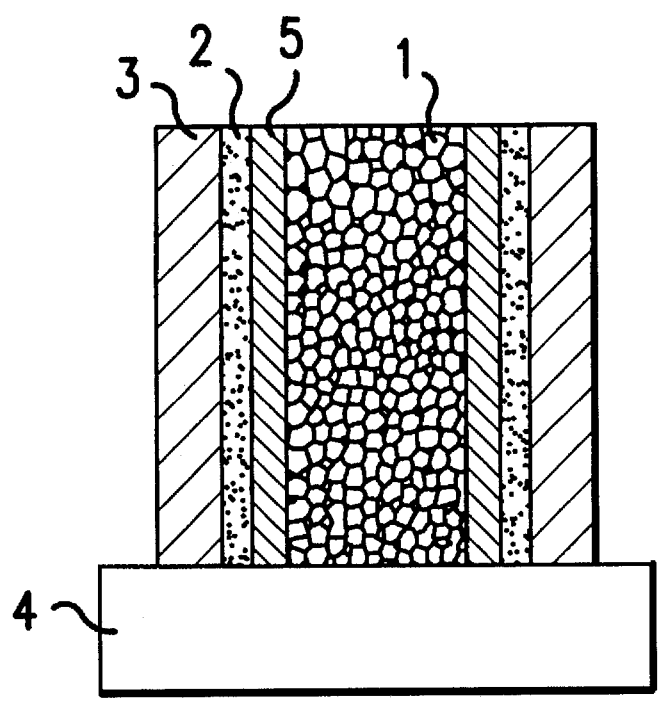
FIG. 3 is a sectional view of another example during calcining.

That is, in cases when the proportion of oxides of other elements is large compared to the proportion of ferric oxides and in cases when there are few iron oxides, the result is that the layer of composite 5 only grows as shown in FIG. 3.

The bonding in Equations 2 and 3 are either bondings from diffusion of alumina with solid solutions of Fe and Ni or Ni and Cr that leach out at the bonding interface or their compounds or are bondings made by melting of metals from the composite which is in a high temperature molten state because of the themite reaction.

To summarize the above, the way the bonding works differs depending on oxide types and blends. The case in FIG. 2 is one where composite 5 and molten metal 6 separate and metal bonds to metal. The case in FIG. 3 is one where the alloy elements that also include iron are in solid solution in composite 5 and metal bonds to composite.

EXAMPLE II

This is an example of making composites for the purpose of bonding with ceramic.

In the case of ceramics, with blends having much ferric oxide as shown in Equation 1 (described as an example of making composites for the purpose of bonding with metal), there is a separation into two layers 5 and 6 as shown in FIG. 2, and there is a bond between the ceramic and the molten iron 6. In cases of bonding with ceramics, a blend of this type is not desirable.

Also, in cases of the oxide blends shown in Equations 2 and 3, that is, in cases when there are absolutely no instances of ferric oxide proportions being small, there will be no separation into the two layers 5 and 6 as shown in FIG. 2 and and it is also possible to use pressed aluminum powder as in FIG. 1, but in this case there is no need for the receiving tube 3 to be metal or ceramic. There should be something to support the ceramic green member, the temporarily calcined product or graphite. However, it will be necessary to be careful of the formation of gas, reactions with the atmosphere and reactions with the growing composite.

Further, the products formed of pressed aluminum powder in FIGS. 1, 2 and 3 will not melt down in spite of being heated over the melting point of aluminum, and because they retain their outer forms there is no need for a melt sink for maintaining them inside the furnace, so that they are economical from the equipment standpoint. They must be calcined in an inert atmosphere only when treating them together with metal. The oxide films of the individual powders forming the pressed aluminum do not grow to a thickness where it is possible to prevent meltdown in inert atmospheres. They melt down partially and their outer forms cannot be maintained. Consequently, for calcining in inert atmospheres it is necessary to make the oxide films thicker ahead of time.

Table 1 substantiates the fact that growth toward fillers containing oxides is possible.

TABLE 1

| Sample | FILLER (w %) | | | | | | | | | | | | | Amount of Growth mm | Heating Time hr | Notes |
|---|---|---|---|---|---|---|---|---|---|---|---|---|---|---|---|---|
| | FeO | Fe$_2$O | MgO | SiO$_2$ | NiO | Cr2O$_2$ | MnO$_2$ | CoO | ToO$_2$ | CuO | AlN | Sl$_3$N$_4$ | SiC | | | |
| 1 | 95 | | 5 | | | | | | | | | | | 4 | 30 | Calcining |
| 2 | | 92 | 8 | | | | | | | | | | | 7 | 30 | temperature |
| 3 | | 92 | 8 | | | | | | | | | | | 6 | 30 | 1,000° C. |
| 4 | | 78 | 8 | | | 14 | | | | | | | | 7 | 30 | Example 3 |
| 5 | | 68 | 8 | | | 14 | 10 | | | | | | | 8 | 30 | only was |
| 6 | | 68 | 8 | | | 14 | 10 | | | | | | | 7 | 30 | carried out in |
| 7 | | | 8 | 92 | | | | | | | | | | 9 | 30 | argon gas and |
| 8 | 46 | | 8 | | 23 | 23 | | | | | | | | 8 | 30 | the calcining |
| 9 | | | 8 | | 46 | 46 | | | | | | | | 9 | 30 | temperature |
| 10 | | | 8 | | 68 | 14 | | 10 | | | | | | 8 | 30 | was 1,100° C. |
| 11 | 46 | | 8 | | | | | | | 46 | | | | 4 | 30 | |
| 12 | 42 | | 16 | | | 42 | | | | | 100 | | | 6 | 30 | |
| 13 | | | 16 | | 70 | 14 | | | | | 220 | | | 7 | 30 | |
| 14 | | | 8 | 78 | | | | | | | | 50 | | 7 | 30 | |
| 15 | | 42 | 8 | 42 | | | | | | | | | 300 | 6 | 30 | |
| 16 | | | 32 | 34 | | | | | | | | | 900 | 4 | 30 | |
| 17 | | | 16 | 84 | | | | | | | | | | 2 | 12 | |
| 18 | 84 | | 16 | | | | | | | | | | | 5 | 12 | |
| 19 | | | 16 | | | 84 | | | | | | | | 5 | 12 | |
| 20 | | | 16 | | 42 | 42 | | | | | | | | 8 | 30 | |
| 21 | 68 | | 32 | | | | | | | | | | | 4 | 12 | |
| 22 | | | 32 | | | 68 | | | | | | | | 6 | 12 | |
| 23 | | | 50 | | | 50 | | | | | | | | 4 | 12 | |
| 24 | | 50 | 50 | | | | | | | | | | | 0 | 12 | | the composite will grow in only one layer 5 as shown in FIG. 3. Either the bonding will be from diffusion of aluminum in solid solutions of Fe and Ni or Ni and Cr leached out at the bonding interface or their compounds, or melt bonding will occur between the ceramic and the composite that contains the leached metals and is in a state of high temperature melting.

EXAMPLE III

This example is one whose object is not bonding, but only to make a composite.

In this case a preform is made with filler containing oxides. The method of immersing it in the melt may be used, Since these oxides have an equilibrium oxygen partial pressure higher than aluminum, there was a themite reaction between aluminum and these oxides, it being recognized that the composites were formed by reaction sintering.

Examples 12 through 16 were mixed in proportions of 100 wt % of oxide powder and from 50 to 900 wt % of nitrides and carbides, and they were in a state of being distributed in the composite as aggregate.

Table 2 gives measurements of physical properties of composites obtained by examples in Table 1.

TABLE 2

| | Oxidant (wt %) | | | | Bending Strength | K.C. | Wear Volume | Bulk Density | Water Absorption | Notes |
|---|---|---|---|---|---|---|---|---|---|---|
| | FeO | NiO | Cr$_2$O$_2$ | MgO | kg/cm$^2$ | MP$\sqrt{m}$ | cm$^2$ | g/cm$^2$ | % | |
| 8 | 46 | 23 | 23 | 8 | 40.939 | 16.028 | 0.0457 | 3.789 | 0.0067 | Fe, Cr and Mg contained in composite |
| 9 | — | 46 | 46 | 8 | 40.375 | 8.587 | 0.0083 | 3.832 | 0.0061 | Ni and Mg contained in composite |
| Reference Example 1 | Oxygen gas | | | | 14.01 | 5.799 | 0.0122 | 3.293 | 0.0118 | Composite contained over 70% silicon carbide as aggregate |
| Reference Example 2 | Oxygen gas | | | | 36.90 | 6.531 | 0.5131 | 3.647 | 0.0123 | Composite only |

Wear Test Conditions

| | |
|---|---|
| Projection pressure | 1 kg/cm$^2$ |
| Projection time | 15 minutes |
| Projection material | 60 μm silicon |
| Projection distance | 50 mm |
| Projection angle | 45 degrees |

KIC Measurement Method

Measured by the SENB Method

Reference Example 1 shown in Table 2 is a composite made by the gas phase oxide method, which is wear resistant material with SiC as an aggregate dispersed at over 70 wt %. Reference Example 2 is also a composite made by the gas phase oxidation method but was grown by blowing oxygen gas onto it, being a composite of pure alumina and aluminum only. Accordingly, the wear resistance of Reference Example 1 is markedly higher than that of Reference Example 2 Only there was a marked drop in bending strength. Example 8 of the present invention also had high bending strength but this shows a destruction toughness value of 16 MP m and that it was raised by alloy element additions of Fe, Ni, Cr and Mg. On the other hand, Example 9 of the present invention had only Ni, Cr and Mg in the composite, and in spite of the fact that it does not contain SiC which raises wear resistance as an aggregate, its wear resistance rises to nearly five times that of Reference Example 1. Also, its bending strength and resistance to destruction values were also high, showing that the various physical properties are raised when alloy elements are included.

The following effects are offered by following the present invention as described above.

(1) Introduction of gaseous oxidizers and the attendant supply apparatus are unnecessary. That is, supply tubes from outside the furnace to inside the furnace and oxygen supply containers around the preformed member are absolutely unnecessary. Except for bondings with metal, the treatment can be done in conventional heating furnaces, there is no need for special technology or apparatus, and since it is possible to carry out calcining and bonding of the composite simultaneously, cheaply and simply, it has an expanded application and utilization for ceramics and metals.

Also, under prior methods it is necessary to supply gaseous oxidizers precisely at the reaction interface where the composite is growing, special furnaces with complex apparatus outside them are required, and performing and barriers on the preforms are also required. However, the present invention requires airtightness for maintaining the atmosphere only when inert atmospheres are required, and there are no special requirements for calcining furnaces and apparatus.

(2) The equipment is simple. That is, when using pressed powder forms with aluminum as the material, the calcining temperature and the powder oxide films preserve the shape of the pressed form and there is no meltdown, so that a melt sink for the mother material melt of prior methods is not required, and from this standpoint also there is no special equipment required.

(3) Atmospheric controls are unnecessary. That is, the method of making composites following the present invention makes it possible to use atmospheres that are oxidizing or inert or just air. Other than calcining together with metal, it is sufficient to have an air atmosphere without atmospheric control (without introducing oxygen or air into the furnace).

(4) It is not necessary to make preforms when using pressed aluminum powder forms. That is, while prior methods had to make preforms because the aluminum material melted, with the present invention it is also possible to use powdered aluminum pressed products, so that oxides can be filled adjoining and in contact with these pressed products so that there is no need to make preforms.

(5) By adding any desired alloy elements to the composite, it is possible to improve bending strength, resistance to deterioration, wear resistance and other physical properties.

(6) It is possible to bond metals and ceramics. That is, when seeking to bond metal and ceramics under prior methods, the growth direction of the composite advances in a direction where it shields gaseous oxidizers, and in the final stage the oxygen that is the driving force for growing and bonding cannot be supplied at the boundary of the growth interface of a composite of metal and ceramic, and bonding becomes impossible. Especially in the case of metals, while with prior methods it is impossible to bond by oxidizing the bond surface, with the present invention all or a portion of the preform or filler is a source of oxygen supply. Thus as long as there is gaseous oxidizer the oxygen can be prearranged in the form of oxides even at the difficult-to-supply bonding interface, so that a themite reaction occurs. Further the heat of reaction causes diffusion and melting so that the ceramic or metal bonds. At this time, when the object of bonding is metal, it will be bonded as long as there is an inert atmosphere. Also, when the object of bonding is ceramic, even if the atmosphere is oxidizing, the composite and iron do not separate so that the iron is not oxidized. Thus bonding is done with the bonding interface maintained in an active state.

(7) The oxidation structure is made fine by solid phase oxidizers. That is, when we compare the microstructures of composites made by simple oxidation reactions in gas phase oxidizers under prior methods with the microstructures of composites made by themite reactions of solid phase oxidizers of the present invention, the structures of the present invention have a finer aluminum three-dimensional network structure than those of prior methods, and strength and toughness are higher.

(8) It is possible to lower heating temperatures. That is, with the method of making composites by themite reactions of solid phase oxidizers of the present invention, compared to methods using oxygen gas oxidation, the calcining temperatures are lower by 100° to 350° C., and it is possible to maintain the temperatures for calcining together with metal at 950° to 1,200° C. This drop in heating temperatures plays a role in preventing quality deterioration of metals such as facet fracture and burning at grain boundaries in crystal grains of carbide steel and stainless steel, offering a wider choice of metal materials that can be calcined simultaneously.

We claim:

1. A method of making composites of metals and their oxides comprising contacting an oxide powder of $Fe_2O_3$ and MgO with one of a pressed metal powder and a metal mass and heating the oxide powder and one of a pressed metal powder and metal mass, whereby the oxide powder is used as an oxygen source.

2. The method of claim 1, wherein the oxide powder is about 92 wt % $Fe_2O_3$ and about 8 wt % MgO and heating occurs at a temperature of about 1,000° C.

3. The method of claim 1, wherein the oxide powder contacts one of a metal member and a ceramic member, whereby the oxide powder is between one of a pressed metal powder and a metal mass and one of a metal member and a ceramic member.

4. A method of making composites of metals and their oxides comprising contacting an oxide powder of FeO, $NiO_2$ and MgO with one of a pressed metal powder and a metal mass and heating the oxide powder and one of a pressed metal powder and a metal mass, whereby the oxide powder is used as an oxygen source.

5. The method of claim 4, wherein the oxide powder is about 46 wt % FeO, about 46 wt % $NiO_2$ and about 8 wt % MgO and heating occurs at a temperature of about 1,000° C.

6. The method of claim 4, wherein the oxide powder contacts one of a metal member and a ceramic member, whereby the oxide powder is between one of a pressed metal powder and a metal mass and one of a metal member and a ceramic member.

7. A method of making composites of metals and their oxides comprising contacting an oxide powder of NiO, $Cr_2O_3$ and MgO with one of a pressed metal powder and a metal mass and heating the oxide powder and one of a pressed metal powder and a metal mass, whereby the oxide powder is used as an oxygen source.

8. The method of claim 7, wherein the oxide powder is about 46 wt % NiO, about 46 wt % $Cr_2O_3$ and about 8 wt % MgO and heating occurs at a temperature of about 1,000° C.

9. The method of claim 7, wherein the oxide powder contacts one of a metal member and a ceramic member, whereby the oxide powder is between one of a pressed metal powder and a metal mass and one of a metal member and a ceramic member.

* * * * *